(12) United States Patent
Tao et al.

(10) Patent No.: US 12,257,649 B2
(45) Date of Patent: Mar. 25, 2025

(54) SOLDERING IRON HEAD AND WELDING DEVICE

(71) Applicants: Tyco Electronics (Dongguan) Ltd., Dongguan (CN); TE Connectivity Solutions GmbH, Schaffhausen (CH); Tyco Electronics (Shanghai) Co., Ltd., Shanghai (CN); Kunshan League Automechanism Co., Ltd, Kunshan (CN)

(72) Inventors: Zongjie (Jason) Tao, Shanghai (CN); Dandan (Emily) Zhang, Shanghai (CN); Roberto Francisco-Yi Lu, Bellevue, WA (US); Hongzhou (Andy) Shen, Dongguan (CN); Yun Luo, Dongguan (CN); Haidong Wu, Kunshan (CN)

(73) Assignees: Tyco Electronics (Dongguan) Ltd., Dongguan (CN); TE Connectivity Solutions GmbH, Schaffhausen (CH); Tyco Electronics (Shangha) Co., Ltd., Shanghai (CN); Kunshan League Automechanism Co., Ltd, Kunshan (CN)

( * ) Notice: Subject to any disclaimer, the term of this patent is extended or adjusted under 35 U.S.C. 154(b) by 37 days.

(21) Appl. No.: 18/315,179

(22) Filed: May 10, 2023

(65) Prior Publication Data

US 2023/0364697 A1 Nov. 16, 2023

(30) Foreign Application Priority Data

May 13, 2022 (CN) .......................... 202210522835.8

(51) Int. Cl.
*B23K 3/00* (2006.01)
*B23K 3/02* (2006.01)

(52) U.S. Cl.
CPC .................................... *B23K 3/025* (2013.01)

(58) Field of Classification Search
CPC .............................................. B23K 3/02–0392
(Continued)

(56) References Cited

U.S. PATENT DOCUMENTS 1,186,773 A * 6/1916 Harris .................. B23K 3/0615
219/541
1,495,686 A * 5/1924 Gretz ..................... B23K 3/025
228/55

(Continued)

FOREIGN PATENT DOCUMENTS

CN 105499741 A * 4/2016 .......... B23K 3/0338
CN 106825829 A * 6/2017
(Continued)

*Primary Examiner* — Kiley S Stoner
(74) *Attorney, Agent, or Firm* — Barley Snyder (57) ABSTRACT

A soldering iron head includes a bottom surface, a first side surface, a second side surface opposite to the first side surface, and a positioning slot formed on the bottom surface and extending between the first side surface and the second side surface. The positioning slot is adapted to accommodate and position an exposed end conductor of a cable. The cross section of the positioning slot is trapezoidal in shape, absent a lower bottom. An upper bottom facing side of the trapezoidal cross section of the positioning slot gradually increases in width from the first side surface to the second side surface.

20 Claims, 6 Drawing Sheets

(58) Field of Classification Search
USPC .................................................. 228/51–55
See application file for complete search history.

(56) References Cited

U.S. PATENT DOCUMENTS

| | | | | |
|---|---|---|---|---|
| 2,025,509 | A * | 12/1935 | Hieber | B23K 3/0615 |
| | | | | 228/53 |
| 3,084,649 | A * | 4/1963 | Parstorfer | H05K 13/0491 |
| | | | | 228/19 |
| 3,580,462 | A * | 5/1971 | Vanyi | B23K 3/02 |
| | | | | D8/30 |
| 3,706,126 | A * | 12/1972 | Cushman | B23K 20/02 |
| | | | | 228/196 |
| 4,473,181 | A * | 9/1984 | Grabow, Jr. | B23K 3/025 |
| | | | | 228/54 |
| 5,025,973 | A * | 6/1991 | Newton | B23K 3/08 |
| | | | | 228/55 |
| 5,379,512 | A * | 1/1995 | Ingle | H05K 3/388 |
| | | | | 29/843 |
| 10,115,699 | B2 * | 10/2018 | Ikoma | H01L 24/78 |
| 11,007,602 | B2 * | 5/2021 | Idota | B23K 20/10 |
| 2015/0336206 | A1 * | 11/2015 | Broekelmann | H01L 24/78 |
| | | | | 228/110.1 |

FOREIGN PATENT DOCUMENTS

| | | | | | |
|---|---|---|---|---|---|
| CN | 106975813 | A * | 7/2017 | | |
| CN | 107350591 | A * | 11/2017 | | |
| CN | 111975158 | A * | 11/2020 | | |
| CN | 116060722 | A * | 5/2023 | | |
| EP | 1250974 | A2 * | 10/2002 | | B23K 3/025 |
| JP | 05050227 | A * | 3/1993 | | |
| JP | 6483892 | B1 * | 3/2019 | | |

* cited by examiner

SOLDERING IRON HEAD AND WELDING DEVICE

CROSS-REFERENCE TO RELATED APPLICATIONS

This application claims the benefit of Chinese Patent Application No. CN202210522835.8 filed on May 13, 2022 in the State Intellectual Property Office of China, the whole disclosure of which is incorporated herein by reference.

FIELD OF THE INVENTION

The present invention relates to a soldering iron head for welding an exposed end conductor of a cable, and to a welding device including the soldering iron head.

BACKGROUND

According to the prior art, an exposed end conductor of a cable is typically welded to a circuit board using a soldering iron head. FIGS. 1-5 show a soldering iron head 1 of the prior art. As shown, a positioning slot 10 is formed on the bottom surface 1a of the soldering iron head 1, and extends between two sides 1b,1c of the soldering iron head 1. In order to locate an exposed end conductor 20 of a cable 2, the cross section of the positioning slot 10 is V-shaped. Two edges a of the bottom opening of the positioning slot 10 are parallel to each other and extend along the longitudinal direction of the positioning slot 10.

Figure 1:
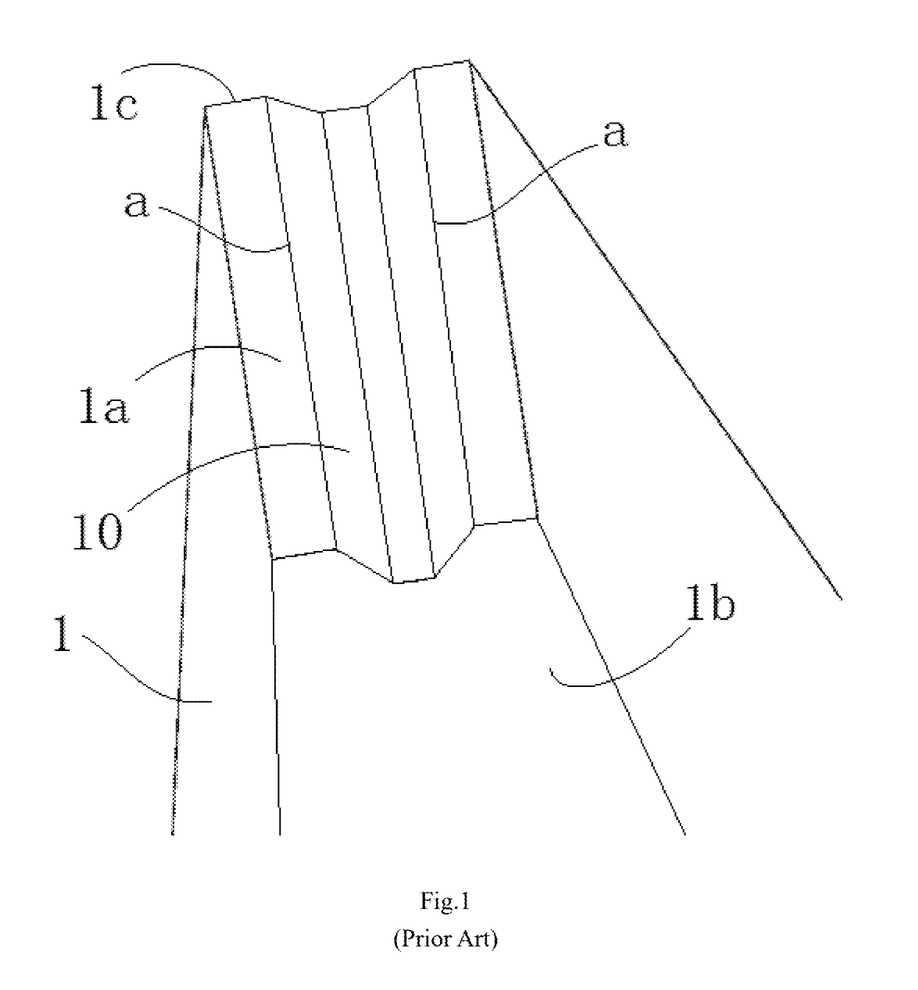
FIG. 1 is an illustrative perspective view of the soldering iron head in the prior art.
Figure 2:
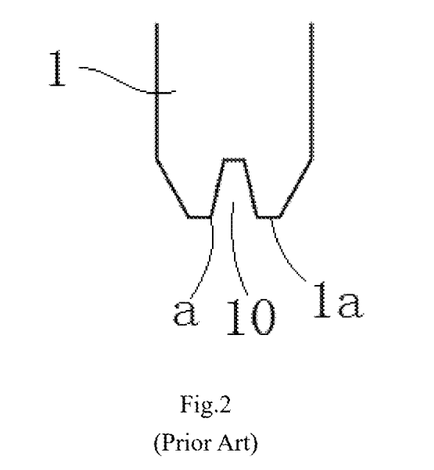
FIG. 2 is a plan view of the soldering iron head shown in FIG. 1 when viewed from its side.
Figure 3:
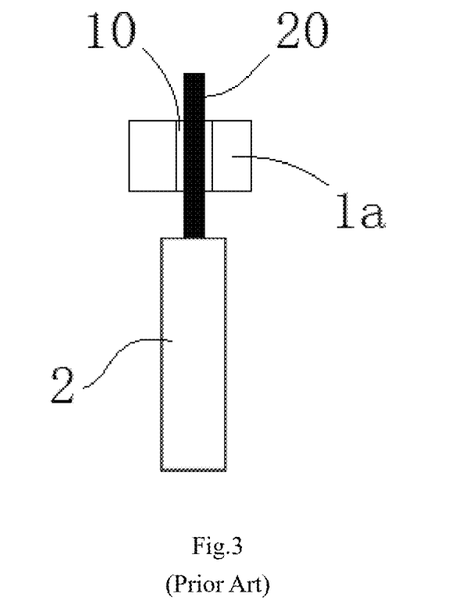
FIG. 3 is a plan view of the soldering iron head shown in FIG. 1 when viewed from its bottom, illustrating the end conductor of the cable contained and positioned in the positioning slot of the soldering iron head.
Figure 4:
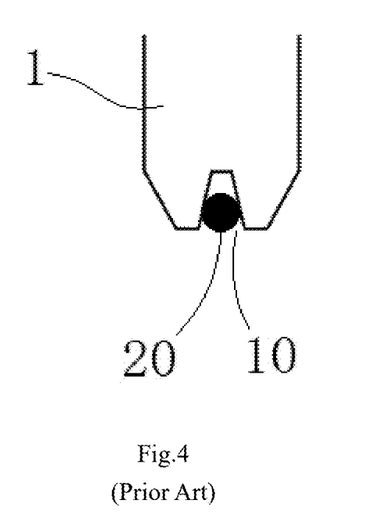
FIG. 4 is a plan view of the soldering iron head shown in FIG. 1 when viewed from its side, illustrating the end conductor of the cable contained and positioned in the positioning slot of the soldering iron head.
Figure 5:
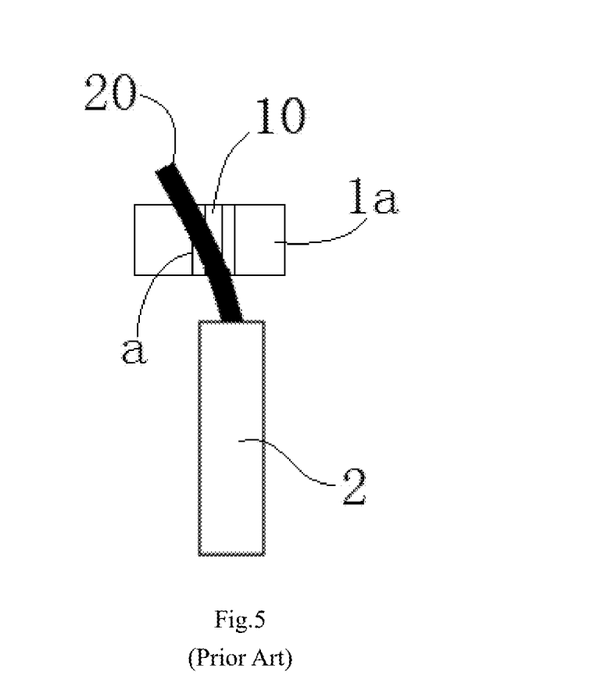
FIG. 5 is a schematic diagram of interference between the edge of the positioning slot of the soldering iron head shown in FIG. 1 and the bent end conductor of the cable.

As shown in FIG. 3 and FIG. 4, when the end conductor 20 of the cable 2 to be welded extends in a straight line along the axial direction of the cable, the end conductor can be accommodated and positioned in the positioning slot 10 of the soldering iron head 1. However, when the end conductor 20 of the cable 2 to be welded is bent at a certain angle relative to the axial direction of the cable, the end conductor will interfere with the edge a of the bottom opening of the positioning slot 10 of the soldering iron head 1, preventing the end conductor from being accommodated and positioned in the positioning slot. Therefore, according to the prior art, before welding, the end conductor 20 of the cable 2 must be straightened so that it extends straight along the axial direction of the cable. This increases the difficulty and complexity of the welding operation.

SUMMARY

According to an embodiment of the present disclosure, a soldering iron head includes a bottom surface, a first side surface, a second side surface opposite to the first side surface, and a positioning slot formed on the bottom surface and extending between the first side surface and the second side surface. The positioning slot is adapted to accommodate and position an exposed end conductor of a cable. A cross section of the positioning slot is generally trapezoidal in shape, without a lower bottom side. An upper bottom facing side of the trapezoidal cross section of the positioning slot gradually increases in width from the first side surface to the second side surface.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A soldering iron head according to an embodiment of the present disclosure includes a bottom surface, a first side surface, a second side surface opposite to the first side surface, and a positioning slot formed on the bottom surface and extending between the first side surface and the second side surface. The positioning slot is configured to accommodate and position an exposed end conductor of a cable. A cross section of the positioning slot is a trapezoid, without a lower bottom. An upper bottom facing side of the trapezoidal cross section of the positioning slot gradually increases in width between the first side surface to the second side surface.

According to another embodiment of the present disclosure, a welding device includes the above-described soldering iron head, and a heating device for heating the soldering iron head.

Figure 6:
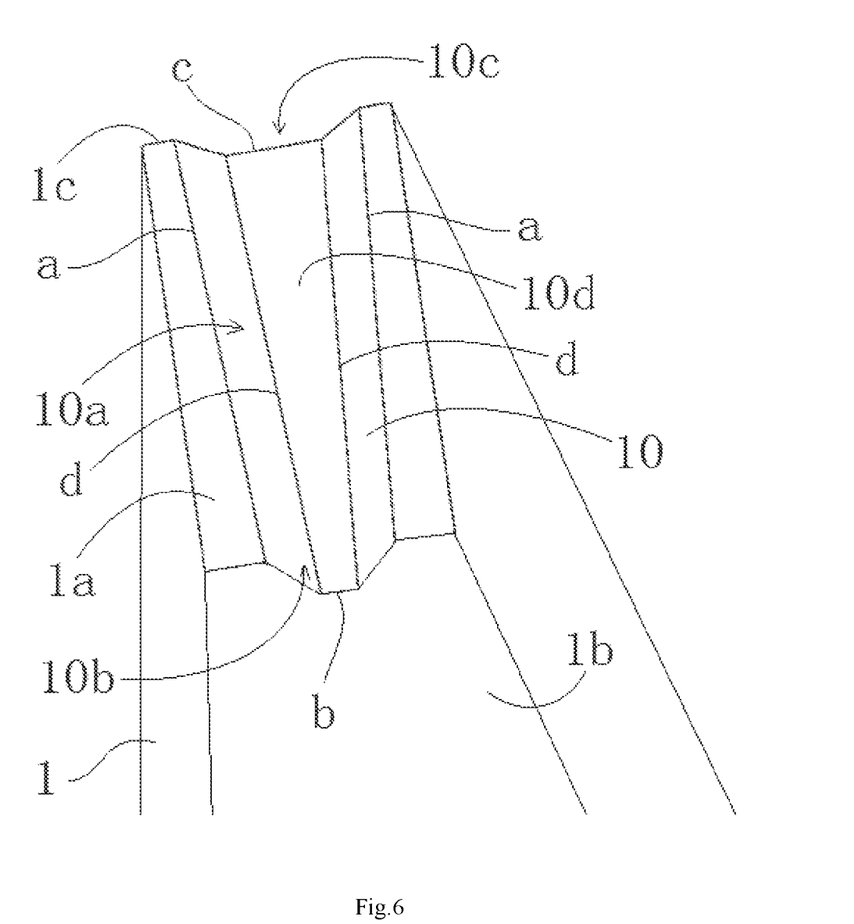
FIG. 6 is an illustrative perspective view of a soldering iron head according to an exemplary embodiment of the present invention.
Figure 7:
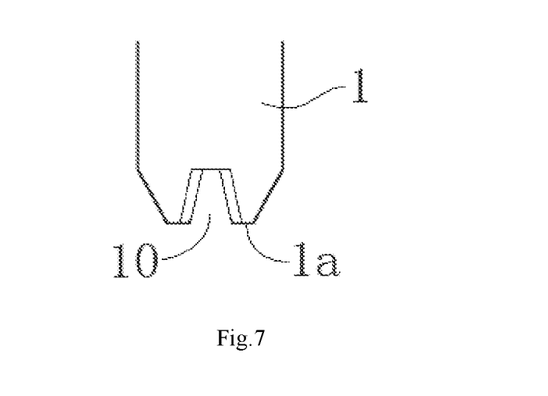
FIG. 7 is a plan view of the soldering iron head shown in FIG. 6 when viewed from its side.

FIG. 6 is a perspective view of the soldering iron head 1 according to an exemplary embodiment of the present invention, and FIG. 7 shows a plan view of the soldering iron head 1 of FIG. 6 when viewed from its side. As shown in FIG. 6 and FIG. 7, the soldering iron head 1 has a body including a bottom surface 1a, a first side surface 1b, a second side surface 1c and a positioning slot 10. The second side surface 1c is opposite to the first side surface 1b. The positioning slot 10 is formed on the bottom surface 1a of the soldering iron head 1 and extends between the first side surface 1b and the second side surface 1c.

Figure 8:
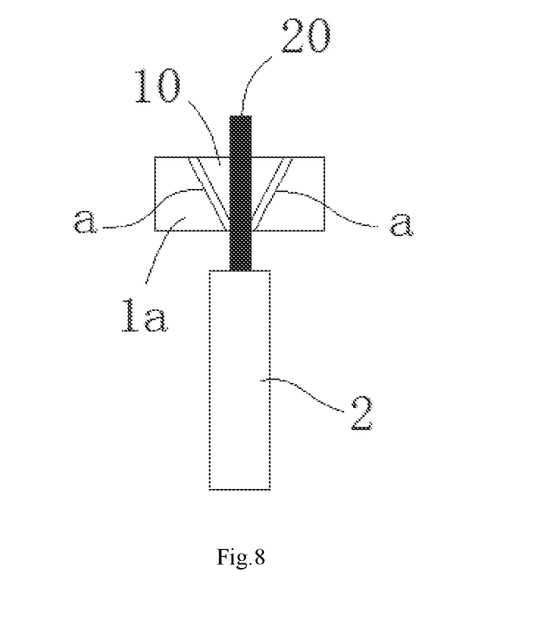
FIG. 8 is a plan view of the soldering iron head shown in FIG. 6 when viewed from its bottom, illustrating the end conductor of the cable contained and positioned in the positioning slot of the soldering iron head.
Figure 9:
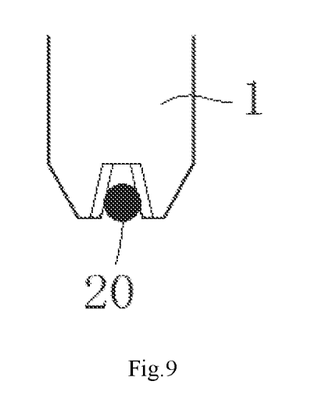
FIG. 9 is a plan view of the soldering iron head shown in FIG. 6 when viewed from its side, illustrating the end conductor of the cable contained and positioned in the positioning slot of the soldering iron head.

FIG. 8 is a plan view of the soldering iron head 1 shown in FIG. 6 when viewed from its bottom, illustrating the end conductor 20 of the cable 2 contained and positioned in the positioning slot 10 of the soldering iron head 1. FIG. 9 is a plan view of the soldering iron head 1 shown in FIG. 6 when viewed from its side, and illustrates the end conductor 20 of the cable 2 contained and positioned in the positioning slot 10 of the soldering iron head. As shown in FIGS. 6 to 9, the cross section of the positioning slot 10 is generally trapezoidal in shape, however, without a lower bottom or lower bottom side thereof. The positioning slot 10 is used to accommodate and locate the exposed end conductor 20 of the cable 2. The size of the upper bottom or upper bottom facing side of the trapezoidal cross section of the positioning slot 10 gradually increases (i.e., in width) from the first side surface 1b to the second side surface 1c.

As shown in FIG. 8 and FIG. 9, in the illustrated embodiment, the end conductor 20 of cable 2 is not bent, and the end conductor 20 of cable 2 extends in a straight line along the axis of cable. In this case, the end conductor 20 of the cable 2 can be accommodated and positioned in the positioning slot 10 of the soldering iron head 1.

As shown in FIGS. 6-9, the positioning slot 10 has a bottom opening 10a on the bottom surface 1a of the soldering iron head 1. The bottom opening 10a of the positioning slot 10 has two first edges a extending between the first side surface 1b and the second side surface 1c. The distance between the two first edges a of the bottom opening 10a in the transverse direction of the positioning slot 10 gradually increases from the first side surface 1b to the second side surface 1c. That is, the width of the bottom opening 10a of the positioning slot 10 gradually widens from the first side surface 1b to the second side surface 1c.

Figure 10:
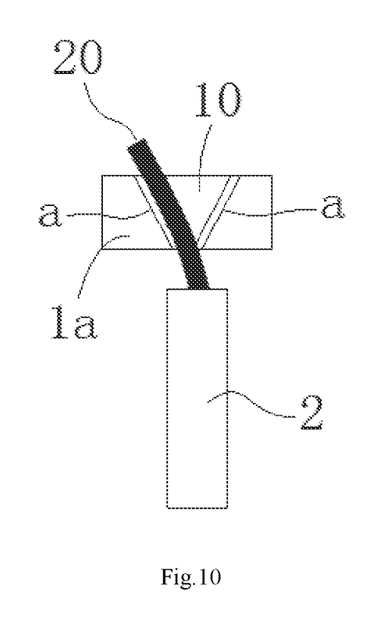
FIG. 10 is a schematic diagram of non-interference between the edge of the positioning slot of the soldering iron head and the bent end conductor of the cable shown in FIG. 6.

FIG. 10 is a schematic diagram illustrating that the first edge a of the positioning slot 10 of the soldering iron head 1 shown in FIG. 6 does not interfere with the bent end conductor 20 of the cable 2. As shown in FIGS. 6-7 and 10, when the end conductor 20 of the cable 2 is bent at a certain angle relative to the axial direction of the cable 2, the end conductor 20 of the cable 2 will not interfere with the first edge a of the bottom opening 10a of the positioning slot 10. Therefore, the bent end conductor 20 of the cable 2 can also be accommodated and positioned in the positioning slot 10 of the soldering iron head 1. Accordingly, before welding the end conductor 20 of the cable 2, it is not necessary to straighten the end conductor, which simplifies welding operations.

As shown in FIGS. 6-10, the two waists of the trapezoidal cross section of the positioning slot 10 are equal, such that the cross section of the positioning slot 10 is in the shape of an isosceles trapezoid without a lower bottom. However, the present invention is not limited to this. The cross section of the positioning slot 10 can be a non-isosceles trapezoid without a lower bottom.

In one embodiment, to length of two first edges a of the bottom opening 10a of the positioning slot 10 are equal. The included angle between one first edge a of the bottom opening 10a of the positioning slot 10 and the longitudinal direction of the positioning slot 10 is equal to the included angle between the other first edge a of the bottom opening 10a of the positioning slot 10 and the longitudinal direction of the positioning slot 10. The included angle between the first edge a of the bottom opening 10a of the positioning slot 10 and the longitudinal direction of the positioning slot 10 is greater than zero degrees and less than 90 degrees. The included angle between the first edge a of the bottom opening 10a of the positioning slot 10 and the longitudinal direction of the positioning slot 10 is greater than 5 degrees and less than 45 degrees. For example, the included angle between the first edge a of the bottom opening 10a of the positioning slot 10 and the longitudinal direction of the positioning slot 10 may be 10 degrees, 20 degrees, 30 degrees or any other suitable angle.

The positioning slot 10 has an upper bottom surface 10d opposite to the bottom opening 10a. The upper bottom surface 10d of the positioning slot 10 extends between the first side surface 1b and the second side surface 1c along the longitudinal direction of the positioning slot 10. The upper bottom surface 10d of the positioning slot 10 has two second edges d extending between the first side surface 1b and the second side surface 1c. The two second edges d of the upper bottom surface 10d of the positioning slot 10 are respectively parallel to the two first edges a of the bottom opening 10a of the positioning slot 10.

A distance between the two second edges d of the upper bottom surface 10d of the positioning slot 10 in the transverse direction of the positioning slot 10 increases gradually from the first side surface 1b to the second side surface 1c. That is, the width of the upper bottom surface 10d of the positioning slot 10 gradually widens from the first side surface 1b to the second side surface 1c. The two first edges a of the bottom opening 10a of the positioning slot 10 and the two second edges d of the upper bottom surface 10d of the positioning slot 10 may be equal in length.

The positioning slot 10 has a first side opening 10b located on the first side surface 1b of the soldering iron head 1. The first side surface 1b is parallel to the transverse direction of the positioning slot 10, so that the first side opening 10b is trapezoidal without a lower bottom. The positioning slot 10 has a second side opening 10c located on the second side surface 1c of the soldering iron head 1. The second side surface 1c is parallel to the transverse direction of the positioning slot 10, so that the second side opening 10c is trapezoidal without a lower bottom. The first side opening 10b and the second side opening 10c are each in the shape of an isosceles trapezoid without a lower bottom.

A waist length of the first side opening 10b is equal to a waist length of the second side opening 10c. The upper bottom c of the second side opening 10c is larger than the upper bottom b of the first side opening 10b. When the soldering iron head 1 is used to weld the end conductor 20 of cable 2, the end conductor passes through the first side opening 10b and the second side opening 10c and is positioned between the two waists of the first side opening 10b. The bottom surface 1a of the soldering iron head 1 is perpendicular to the first side surface 1b and the second side surface 1c and parallel to the upper bottom surface 10d of the positioning slot 10.

Still referring to FIGS. 6-10, a welding device is also disclosed. The welding device includes the above soldering iron head 1 and a heating device for heating the soldering iron head 1. The heating device can be an electric heating device, and is not shown in the interest of brevity.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A soldering iron head, comprising:
   a bottom surface;
   a first side surface;
   a second side surface opposite to the first side surface; and
   a positioning slot formed on the bottom surface and extending between the first side surface and the second side surface, the positioning slot is adapted to accommodate and position an exposed end conductor of a cable and defines a trapezoidal cross section, an upper bottom facing side of the trapezoidal cross section increases in width from the first side surface to the second side surface.

2. The soldering iron head according to claim 1, wherein two waists of the trapezoidal cross section of the positioning slot are equal to each other.

3. The soldering iron head according to claim 1, wherein:
   the positioning slot has a bottom opening on the bottom surface of the soldering iron head and includes two first edges extending between the first side surface and the second side surface; and
   a distance between the two first edges of the bottom opening in a transverse direction of the positioning slot gradually increases from the first side surface to the second side surface.

4. The soldering iron head according to claim 3, wherein a length of the two first edges are equal.

5. The soldering iron head according to claim 3, wherein an angle between one first edge of the bottom opening and a longitudinal direction of the positioning slot is equal to an angle between the other first edge of the bottom opening and the longitudinal direction of the positioning slot.

6. The soldering iron head according to claim 5, wherein the angle between the first edge of the bottom opening and the longitudinal direction of the positioning slot is greater than 0 degrees and less than 90 degrees.

7. The soldering iron head according to claim 6, wherein the angle between the first edge of the bottom opening and the longitudinal direction of the positioning slot is greater than 5 degrees and less than 45 degrees.

8. The soldering iron head according to claim 3, wherein the positioning slot has an upper bottom surface opposite to the bottom opening and extending between the first side surface and the second side surface along the longitudinal direction of the positioning slot.

9. The soldering iron head according to claim 8, wherein the upper bottom surface includes two second edges extending between the first side surface and the second side surface, the two second edges are respectively parallel to the two first edges.

10. The soldering iron head according to claim 9, wherein a distance between the two second edges of the upper bottom surface in the transverse direction of the positioning slot gradually increases from the first side surface to the second side surface.

11. The soldering iron head according to claim 8, wherein a length of the two first edges and the two second edges are equal.

12. The soldering iron head according to claim 1, wherein:
    the positioning slot has a first side opening located on the first side surface of the soldering iron head; and
    the first side surface is parallel to a transverse direction of the positioning slot.

13. The soldering iron head according to claim 12, wherein:
    the positioning slot has a second side opening located on the second side surface of the soldering iron head;
    the second side surface is parallel to the transverse direction of the positioning slot; and
    the upper bottom of the second side opening is larger than the upper bottom of the first side opening.

14. The soldering iron head according to claim 13, wherein the first side opening and the second side opening are in the shape of an isosceles trapezoid, and a waist length of the first side opening is equal to a waist length of the second side opening.

15. The soldering iron head according to claim 14, wherein the end conductor of the cable passes through the first side opening and the second side opening and is positioned between the two waists of the first side opening.

16. The soldering iron head according to claim 1, wherein the bottom surface of the soldering iron head is perpendicular to the first side surface and the second side surface and parallel to the upper bottom surface of the positioning slot.

17. A device, comprising:
    a soldering iron head, including:
    a bottom surface;
    a first side surface;
    a second side surface opposite the first side surface; and
    a positioning slot formed on the bottom surface and extending between the first side surface and the second side surface, the positioning slot defining a trapezoidal cross section, an upper bottom facing side of the trapezoidal cross section increases in width from the first side surface to the second side surface; and
    a heating device adapted to heat the soldering iron head.

18. The device according to claim 17, wherein two waists of the trapezoidal cross section of the positioning slot are equal to each other.

19. The device according to claim 17, wherein the positioning slot has a bottom opening on the bottom surface of the soldering iron head and includes two first edges extending between the first side surface and the second side surface.

20. The device according to claim 19, wherein a distance between the two first edges of the bottom opening in a transverse direction of the positioning slot gradually increases from the first side surface to the second side surface.

* * * * *